United States Patent [19]
Yamanaka et al.

[11] Patent Number: 6,059,171
[45] Date of Patent: *May 9, 2000

[54] BICYCLE CRANK AND MANUFACTURING METHOD

[75] Inventors: Masahiro Yamanaka, Izumisano; Toru Iwai, Ibaragi, both of Japan

[73] Assignee: Shimano, Inc., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/687,109

[22] Filed: Jul. 22, 1996

[30] Foreign Application Priority Data

| Aug. 4, 1995 | [JP] | Japan | H7-219834 |
| Sep. 12, 1995 | [JP] | Japan | H7-258241 |
| Feb. 8, 1996 | [JP] | Japan | H8-046656 |

[51] Int. Cl.[7] .......................... B21D 39/00; B23K 31/02; B23K 31/00; G05G 1/14
[52] U.S. Cl. .......................... 228/164; 228/125; 74/594.1; 74/594.2
[58] Field of Search .................. 74/594.1, 594.2, 74/594.3, 594.4, 594.5, 594.6, 594.7; 228/125, 164

[56] References Cited

U.S. PATENT DOCUMENTS

| 3,110,227 | 11/1963 | Croucher | 228/176 |
|---|---|---|---|
| 3,592,103 | 7/1971 | Brown | 90/88 |
| 4,465,221 | 8/1984 | Schmidt | 228/125 |
| 4,602,732 | 7/1986 | Schaeffer et al. | 228/125 |
| 4,811,626 | 3/1989 | Bezin | 74/594.1 |
| 5,094,383 | 3/1992 | Anderson et al. | 228/176 |
| 5,197,353 | 3/1993 | Trenerry et al. | 74/594.1 |
| 5,495,977 | 3/1996 | Hildebrandt et al. | 228/112.1 |
| 5,720,833 | 2/1998 | Grube et al. | 156/73.1 |
| 5,819,599 | 10/1998 | Yamanaka | 74/594.1 |
| 5,819,600 | 5/1999 | Yamanaka | 74/594.1 |
| 5,845,543 | 12/1998 | Yamanaka | 74/594.1 |
| 5,893,299 | 4/1999 | Yamanaka | 74/594.2 |
| 5,904,072 | 5/1999 | Yamanaka | 74/594.2 |

FOREIGN PATENT DOCUMENTS

| 417313 | 6/1910 | France | 74/594.1 |
|---|---|---|---|
| 2642033 | 7/1990 | France | B62M 3/16 |
| 850273 | 9/1952 | Germany . | |
| 2-18652 | 4/1990 | Japan | B21D 53/86 |
| 15117 | 5/1895 | United Kingdom | 74/594.1 |
| 21149 | 6/1897 | United Kingdom | 74/594.1 |
| 26220 | 9/1899 | United Kingdom | 74/594.1 |
| 2225296 | 5/1990 | United Kingdom | B62M 3/00 |

OTHER PUBLICATIONS

Welding Handbook, 8th ed. vol. 1, AWS, pp. 575–585, 1991.
European search report for EPO 96 30 5553, dated Nov. 4, 1996.

*Primary Examiner*—Patrick Ryan
*Assistant Examiner*—Kiley Stoner
*Attorney, Agent, or Firm*—James A. Deland

[57] ABSTRACT

A crank arm is formed with an enclosed hollow section, a first solid end fixed to one end of the hollow section and defining a first opening for fitting to a crank axle, and a second solid end fixed to a second end of the hollow section and defining a second opening for fitting to a pedal. The hollow section is constructed from a middle section having a longitudinal groove and a separate lid fixed to the middle section for enclosing the groove. The first solid end has a thicker cross section than the second solid end so that the stress applied to the crank is substantially constant. The hollow section may be keel-shaped to further enhance the strength of the crank arm without stress being concentrated in any particular location. To form the crank arm, a crank arm body is formed having a first opening on one end for fitting to a crank axle, a second opening on another end for fitting to a pedal, and a longitudinal groove. A lid member is positioned over the longitudinal groove, and then the lid member is welded to the crank arm body. Reverse beads are formed inside the longitudinal groove junctions between the lid member and the crank arm body, and any external beads formed by the welding step are shaved so that a surface of a junction between the middle section and the lid is even with a surface of the middle section and the lid along an entire length of the junction.

18 Claims, 9 Drawing Sheets

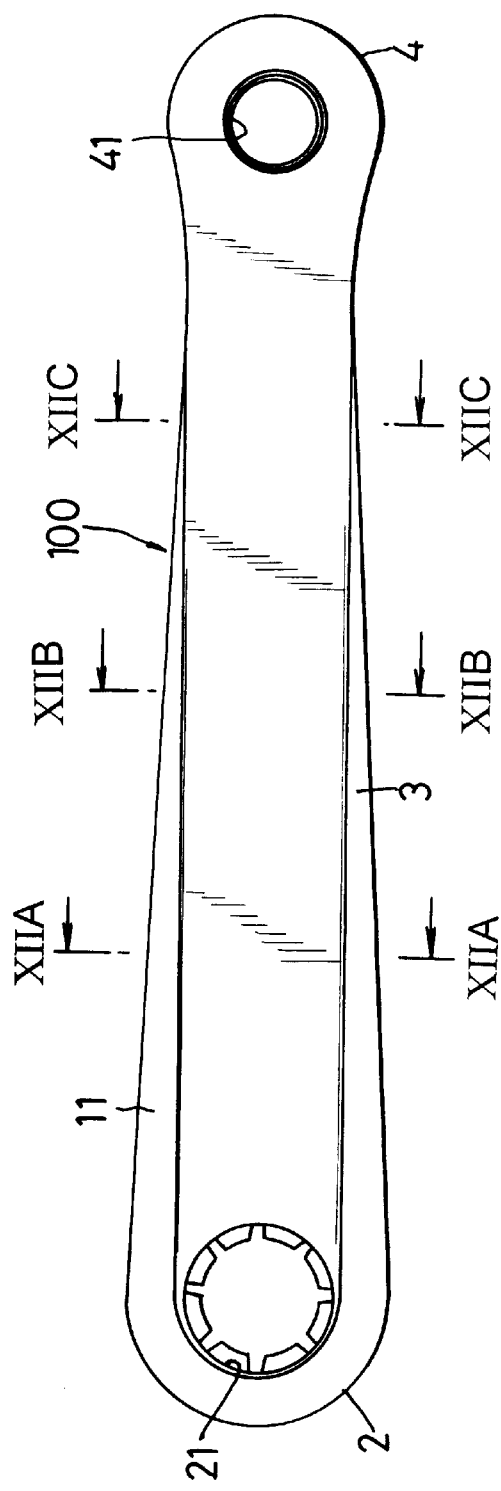
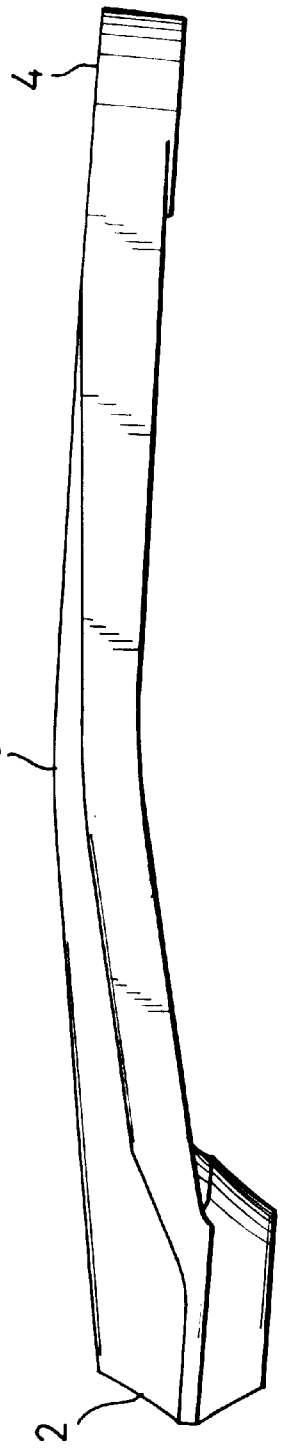
FIG. 8
FIG. 9

BICYCLE CRANK AND MANUFACTURING METHOD

BACKGROUND OF THE INVENTION

The present invention is directed to a bicycle crank and, more particularly, to a bicycle crank having a hollow portion to make the crank lighter in weight.

Bicycles should be made as light-weight as possible, and all the parts of a bicycle should therefore be made as light as possible. This is true of bicycle cranks as well. A bicycle crank that has been made light-weight by being manufactured in the form of a tube that has a hollow structure is disclosed in Japanese Patent Publication 2-18652, for example. Because such hollow cranks are formed from a pipe, they have suffered from relatively weak strength. There has also been little freedom in the design of the crank shape when formed from a pipe. Another drawback is that an appearance of high grade quality and the like is difficult to achieve because of limitations on the forming process, despite a demand for certain types of designs.

SUMMARY OF THE INVENTION

The present invention is directed to a bicycle crank arm and a method of manufacturing such a crank arm wherein the crank arm has light weight, high strength, and more freedom of design. In one embodiment of the present invention, a crank arm is formed with an enclosed hollow section, a first solid end fixed to one end of the hollow section and defining a first opening for fitting to a crank axle, and a second solid end fixed to a second end of the hollow section and defining a second opening for fitting to a pedal. The hollow section is constructed from a middle section having a longitudinal groove and a separate lid fixed to the middle section for enclosing the groove. The first solid end has a thicker cross section than the second solid end so that the stress applied to the crank arm is substantially constant. The hollow section may be keel-shaped to further enhance the strength of the crank arm without stress being concentrated in any particular location.

To form the crank arm according to the present invention, a crank arm body is formed having a first opening on one end for fitting to a crank axle, a second opening on another end for fitting to a pedal, and a longitudinal groove. A lid member is positioned over the longitudinal groove, and then the lid member is welded to the crank arm body. By forming the crank arm with a welded lid member, many different crank arm shapes may be constructed while still maintaining an attractive appearance.

In a more specific embodiment of the method of manufacturing the crank arm, reverse beads are formed inside the longitudinal groove at junctions between the lid member and the crank arm body, and any external beads formed by the welding step are shaved off to make an aesthetic structure. For further aesthetics and lighter weight, the lid member may be formed as a single plate having a beveled outer peripheral surface. To facilitate welding the lid member to the crank arm body, a stepped surface may be formed on the crank arm body inside the longitudinal groove, and the lid member may be placed on the stepped surface. To enhance the effectiveness of the weld, a concave groove may be formed on an inner side surface of the crank arm aligned below the lid member so that a portion of the crank arm above the concave groove has a thickness approximately equal to a thickness of the lid member.

BRIEF DESCRIPTION OF THE DRAWINGS

FIG. 8 is a front view of a particular embodiment of a left side crank arm according to the present invention;

FIG. 9 is a side view of the crank arm shown in FIG. 8;

DETAILED DESCRIPTION OF THE EMBODIMENTS

Figure 1:
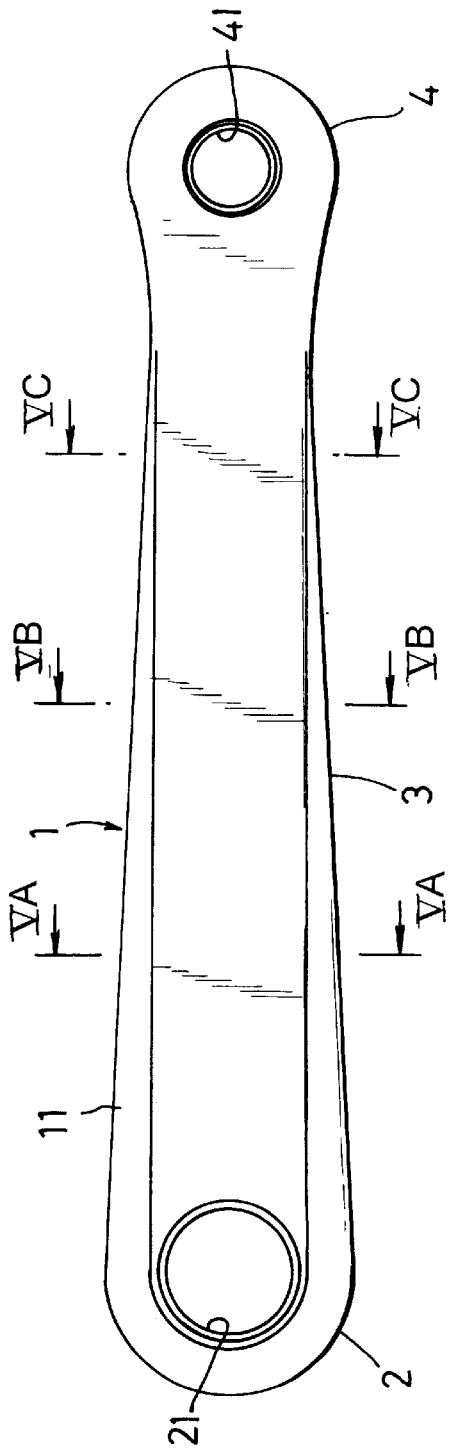
FIG. 1 is a front view of a particular embodiment of a right side crank arm according to the present invention.

FIG. 1 is a front view of a particular embodiment of a right crank 1 according to the present invention. In this embodiment, the right crank 1 is made of an aluminum alloy. As shown in FIG. 1, the end 4 of the crank on the pedal mounting side is narrow, while the end 2 of the crank on the crank shaft mounting side has a thicker cross section. By thus altering the thickness of the right crank 1 according to location, the stress applied to the right crank can be made virtually constant, no matter what the cross section, as a result of the alteration of the size of the cross section area.

A trademark indicating the manufacturer's name or the manufacturer's logo can be imprinted by laser marking or the like on the front surface of the right crank 1. A beveled surface 11 is formed at both front side angled components of the right crank 1, wherein the size of the beveling is greater near the end 2 of the crank on the crank shaft mounting side and continuously narrows toward the end 4 of the crank on the pedal mounting side.

Figure 6:
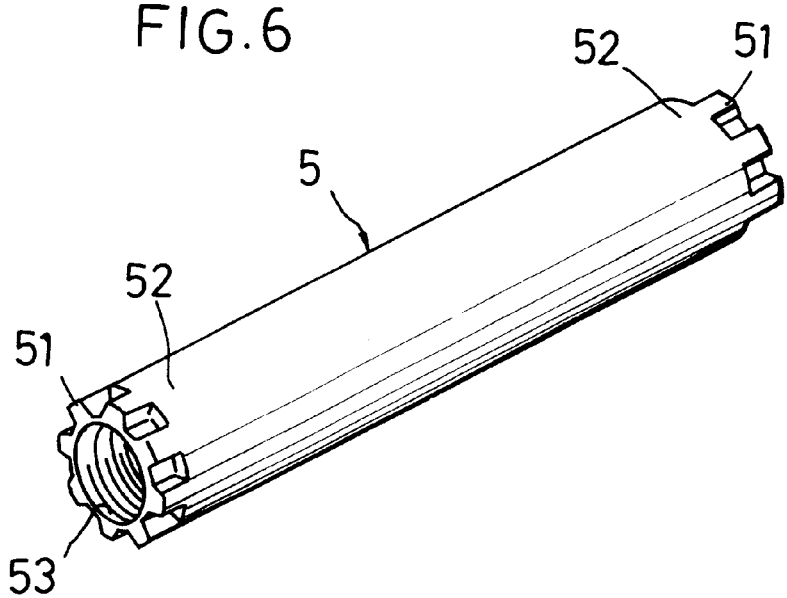
FIG. 6 is an oblique view of a particular embodiment of a crank shaft according to the present invention for use with the crank arm shown in FIG. 1.
Figure 7:
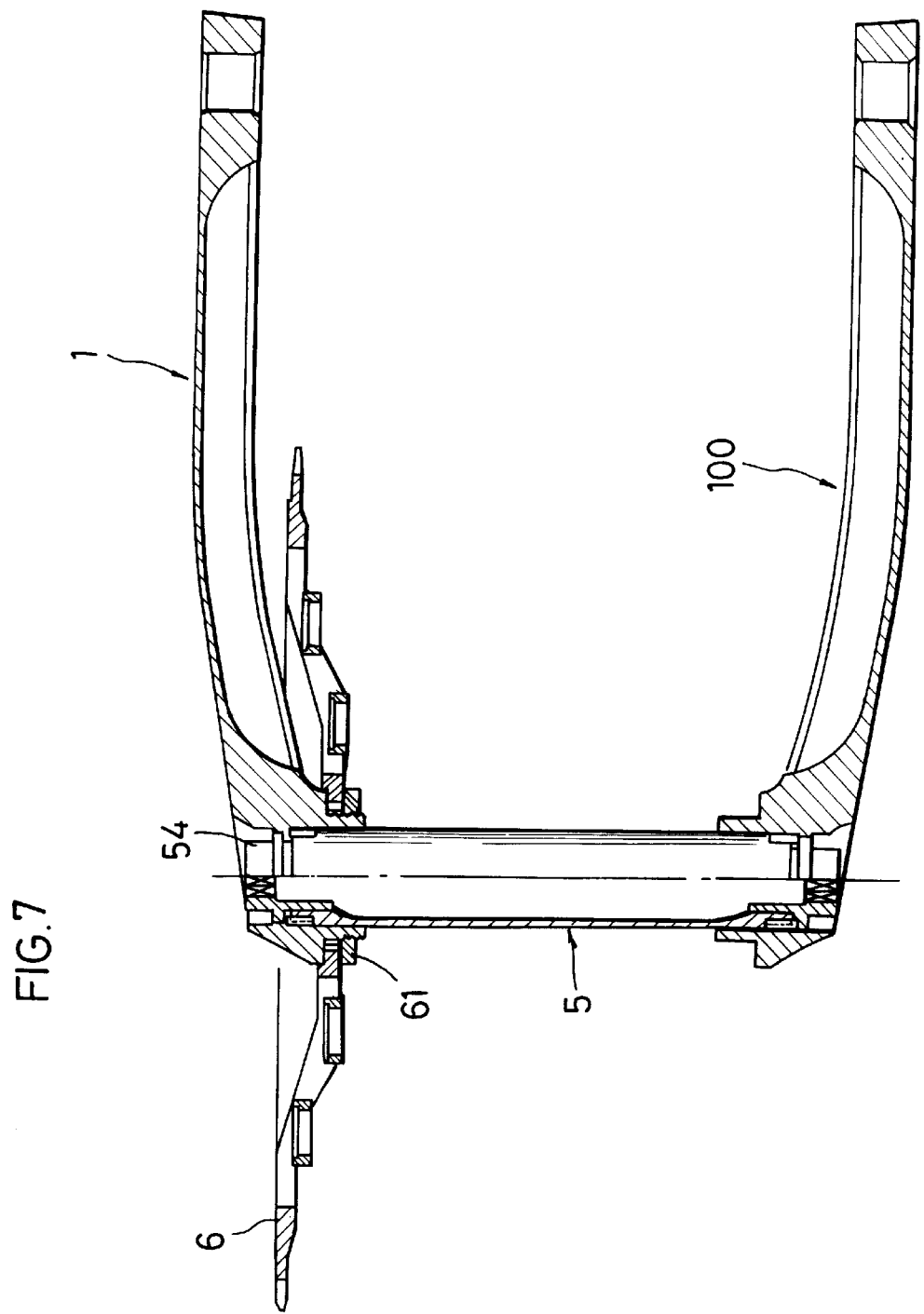
FIG. 7 is a cross sectional view of right and left side crank arms attached to the crank shaft shown in FIG. 6.

A crank shaft mounting hole 21 is formed at the end 2 of the right crank 1 on the crank shaft mounting side to allow the right crank 1 to be attached to the crank shaft 5 (FIG. 6). As shown in FIG. 7, the right crank 1 is attached to the crank shaft 5 by inserting the crank shaft 5 into this crank shaft mounting hole 21. A pedal mounting hole 41 is formed on the end 4 of the right crank 1 on the pedal mounting side. One end of a pedal shaft for a pedal (not shown in figure) is mounted in the pedal mounting hole 41.

Figure 2:
FIG. 2 is a side view of the crank arm shown in FIG. 1.
Figure 3:
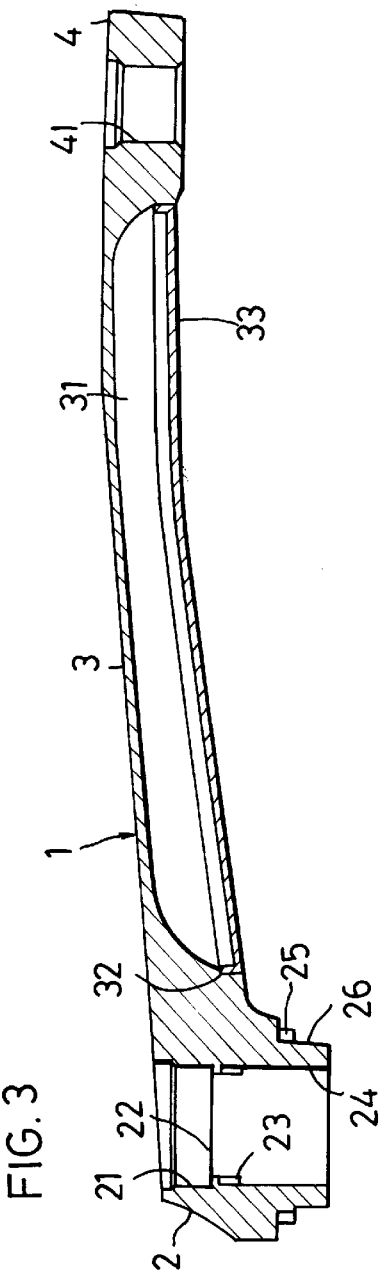
FIG. 3 is a longitudinal cross sectional view of the crank arm shown in FIG. 1.

FIG. 2 is a side view of the right crank 1, and FIG. 3 is a longitudinal cross section of the right crank 1. As shown in FIG. 3, a longitudinally extending concave groove 31 is formed on the reverse face in the middle 3 of the crank. The configuration of the concave groove 31 is such that the groove depth continuously diminishes on either side toward both ends of the concave groove 31, with the groove depth being most shallow at either end. That is, the bottom of the concave groove 31 is approximately keel-shaped, wherein the bottom in the middle of the concave groove 31 is virtually parallel with the front surface of the middle part 3 of the crank.

In this embodiment, a stepped component 32 is formed at the open face side of the concave groove 31, and a lid member 33 is fitted to this stepped component 32. The circumference of the lid member 33 and the right crank 1 main body are fixed to each other by inert gas arc welding using argon gas. The reverse surface of the right crank 1 main body and the surface of the lid member 33 are arranged so as to form a single plane. Any build up 34 from the welding should be shaved off by a cutting process or the like after welding to fashion a single plane so as to provide an attractive appearance. Of course, the lid member 33 and the right crank 1 main body may be joined using an adhesive instead of by welding. Examples of adhesives which can be used include epoxy resins and cyanoacrylates. Caulking and adhesives may be used concurrently. In such cases, the gaps between the caulking joints can be filled with an adhesive, thereby preventing water or the like from penetrating inside.

Figure 4:
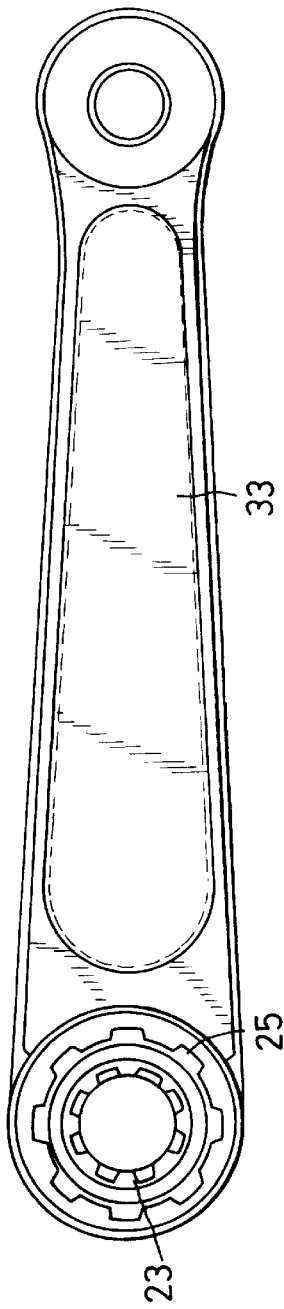
FIG. 4 is a rear view of the crank arm shown in FIG. 1.

A crank shaft mounting hole 21 is provided at the end 2 of the crank on the crank shaft mounting side, and a flange 22 protrudes on the inside surface inside the crank shaft mounting hole 21. Female splines 23 are provided on the other side of the flange 22, and the part of the crank shaft mounting hole 21 on the other side of the splines 23 is formed as a centering component 24. The centering component 24 is in the form of a cylindrical tapering hole that widens to the other side. In this example, the tapering angle is 2 to 3°. The tapering face of the centering component 24 adheres to the tapered face of the centering component 52 of the crank shaft 5 so as to align the two cores and integrally connect the two. Male splines 25 functioning as a gear plate 6 detent are formed on the external peripheral surface of end 2, and threads 26 for fixing the gear plate 6 to crank 1 are formed adjacent to splines 25. As shown in FIG. 4, the splines 23 and 25 each have eight teeth. In this particular design, a lower number of teeth results in insufficient engaging strength during rotating engagement, whereas a greater number of teeth makes processing more difficult and results in greater costs, while the indexing positioning in the rotating direction is more susceptible to malfunction during assembly. Of course, other designs within the scope of the present invention may justify a lesser or greater number of teeth.

Figure 5A:
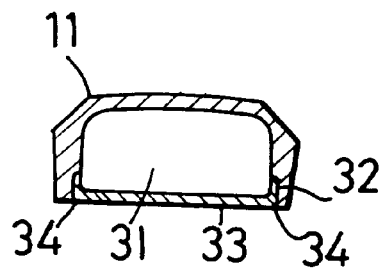
FIGS. 5A–5C are cross sectional views taken along lines A—A, B—B and C—C, respectively, in FIG. 1.
Figure 5B:
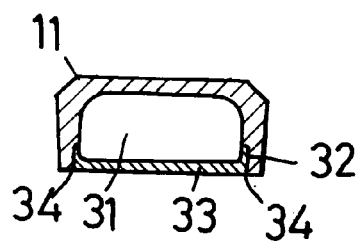
Figure 5C:
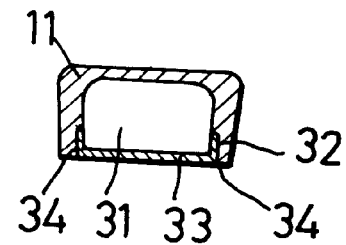

FIGS. 5A–5C are cross sectional views taken along lines A—A, B—B and C—C, respectively, in FIG. 1. As shown in those figures, the cross section interior of the middle part 3 of the crank is thus formed, in virtually all parts, in the form of the concave groove 31 and is thus light-weight.

FIG. 6 depicts the appearance of the crank shaft 5 which, in this embodiment is in the form of a hollow pipe. Centering components 52 are formed at both ends of the crank shaft 5. The centering components 52 are tapered, narrowing at the end, at a tapering angle of 2 to 3°. Male splines 51 in the form of eight teeth are formed at the ends beyond the centering components 52. The outer peripheral surface of the teeth form a surface that is connected with the outer peripheral surface of the centering components 52. Female threads 53 for fixing the cranks are provided at the ends of the crank shaft 5. As shown in FIG. 7, the wall thickness of crank shaft 5 is thinner in the middle than it is at both ends. In this embodiment, the material for the crank shaft 5 is an aluminum alloy and is hollow, allowing it to be made light-weight.

FIG. 7 shows the crank shaft 5, right crank 1, and gear plate 6 assembled. Splines on gear plate 6 (not shown) engage splines 25 for fitting gear plate 6 to crank 1, and a nut 61 is screwed to threads 26 for fastening gear plate 6 to right crank 1. The right crank 1 to which the gear plate 6 has been fixed is fitted to one end of the crank shaft 5 so that splines 23 in opening 21 mesh with splines 51 on crank shaft 5 to effect high strength engagement in the direction or rotation, and the assembly is fixed by a bolt 54 screwed into threads 53. The centering component 24 of the right crank 1 and the centering component 52 of the crank shaft 5 are fitted together to center the two with a high degree of precision. A left crank 100 with no gear plate is attached and fixed to the other end of the crank shaft 5.

Figure 10:
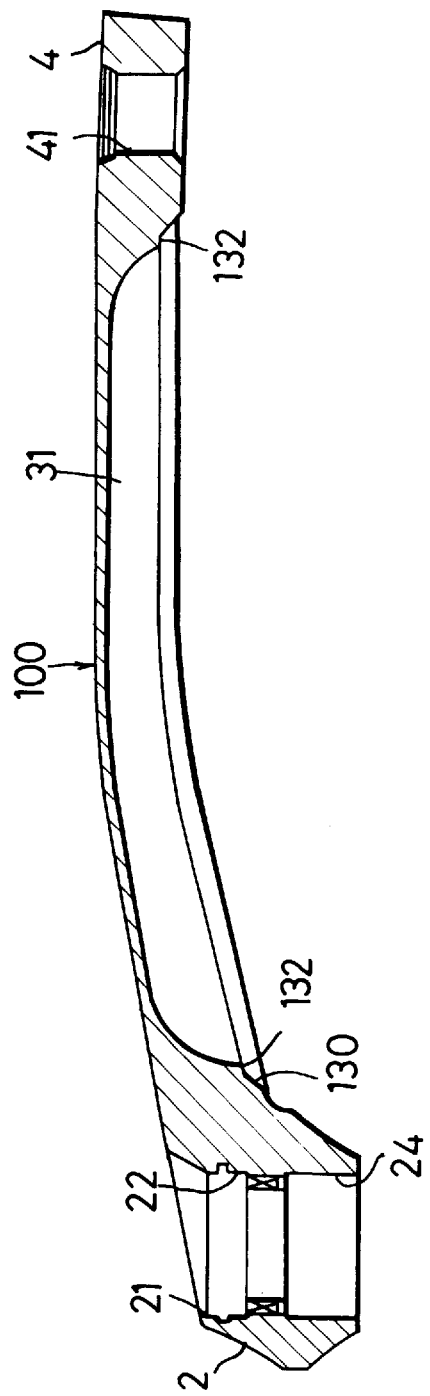
FIG. 10 is a longitudinal cross sectional view of the crank arm shown in FIG. 8.
Figure 11:
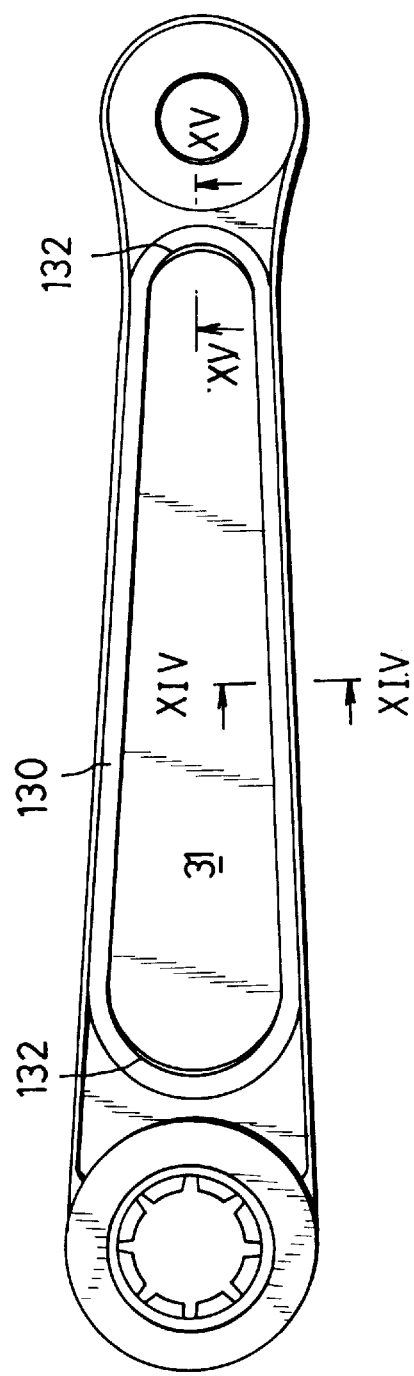
FIG. 11 is a rear view of the crank arm shown in FIG. 8.
Figure 12A:
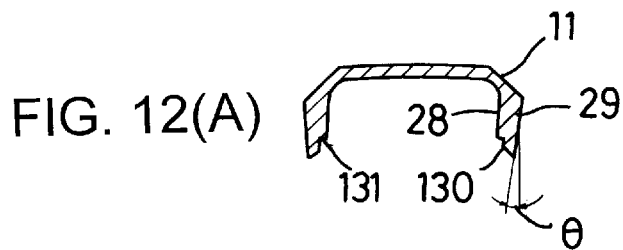
FIGS. 12A–12C are cross sectional views taken along lines A—A, B—B and C—C, respectively, in FIG. 8.
Figure 12B:
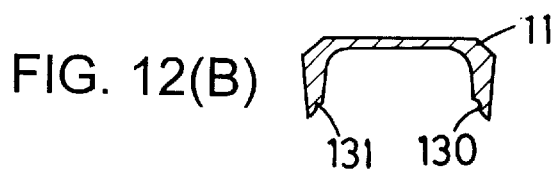
Figure 12C:
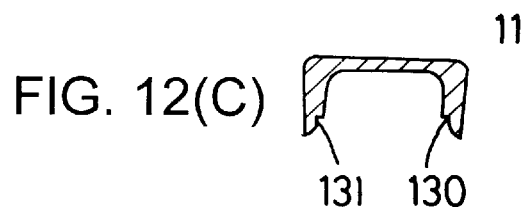

FIG. 8 is front view of a particular embodiment of a left crank 100 according to the present invention, FIG. 9 is a side view of the left crank 100, FIG. 10 is a longitudinal cross section of the left crank 100, and FIG. 11 is a rear view of the left crank 100. The left crank 100 in this example is essentially the same as the structure of the right crank 1 discussed above, but there are some differences. Reference numbers which are the same as those in the right crank 1 indicate the same parts. To avoid redundancy, these parts will not be described again.

In the right crank 1, splines 25 were formed as a gear plate 6 detent on the external peripheral surface at the end 2 of the crank on the crank shaft mounting side, and threads 26 for fixing the gear plate 6 were formed adjacent to splines 25. However, the left crank 100 has no gear plate 6, so these components are omitted.

Stepped components 132 are formed on opposite ends of the concave groove 31. These stepped components 132 protrude slightly (width of 1.0 mm in this example) from the peripheral wall of the concave groove 31 and serve as temporary detents when the lid member 133 described below is welded. In this embodiment, the outer wall 29 of the left crank 100 is formed at an angle φ (5° in this example) with the inner wall 28 of convex groove 31. The upper part of the concave groove 31 is open, the periphery is beveled, and a 45° beveled surface 130 and horizontal flat face 131 are provided.

Figure 13:
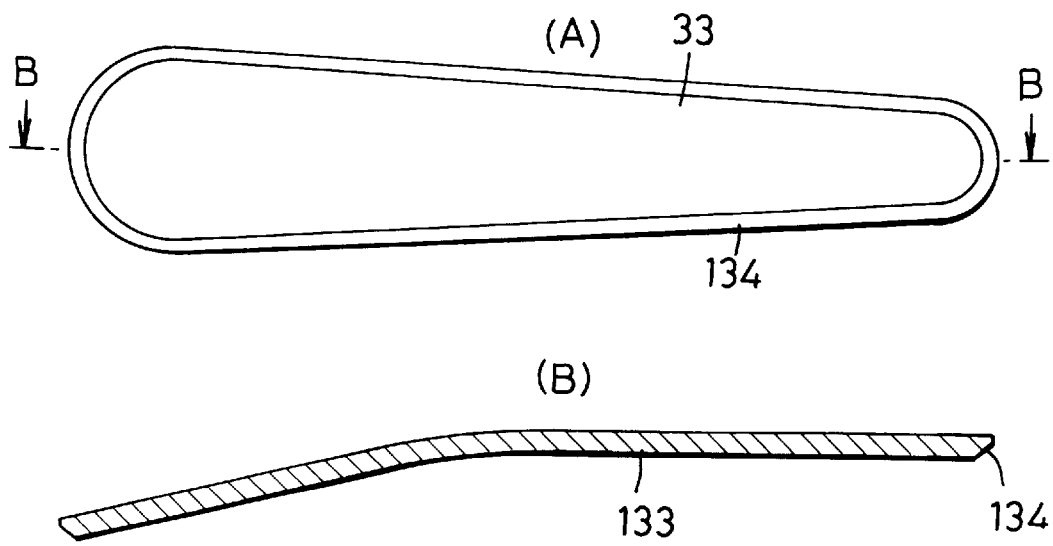
FIG. 13A is a front view of a particular embodiment of a lid member used to form the crank arms according to the present invention.
FIG. 13B is a cross sectional view of the lid member taken along line B—B in FIG. 13A.

FIG. 13A is a front view of a particular embodiment of a lid member used to form the crank arms according to the present invention, and FIG. 13B is a cross sectional view of the lid member taken along line B—B in FIG. 13A. In this embodiment, the lid member 133 is made of one aluminum alloy plate and is bent into a shape allowing the lid to be placed along the beveled incline 130 of the groove 31 for assembly. In this embodiment, a 45° beveled incline 134 is formed at the angled component of the outer periphery of the lid member 133.

A method for manufacturing the right crank 1 and the left crank 100 is described below using left crank 100 as an example. First, the left crank 100 main body is formed from an aluminum alloy by cold forging. Following cold forging, the flash is shaved off by a mechanical process, and the body is processed into the aforementioned shape. The lid member 133 is similarly processed into the aforementioned shape by cold forging. When the parts have been completely processed, the lid member 133 is placed and temporarily supported on the stepped component 132 on either side of the concave groove 31.

Figure 14:
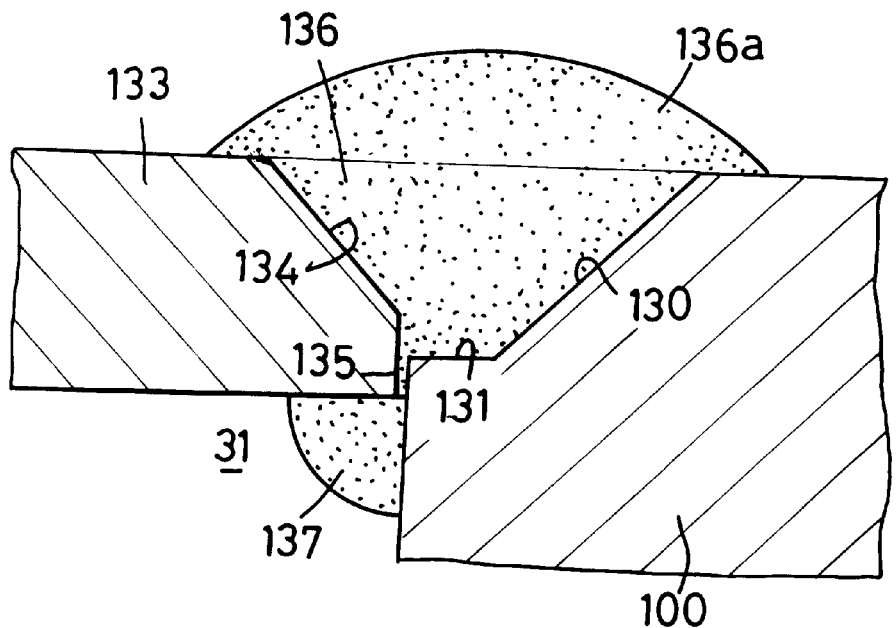
FIG. 14 is a cross sectional view taken along line XIV—XIV in FIG. 11.
Figure 15:
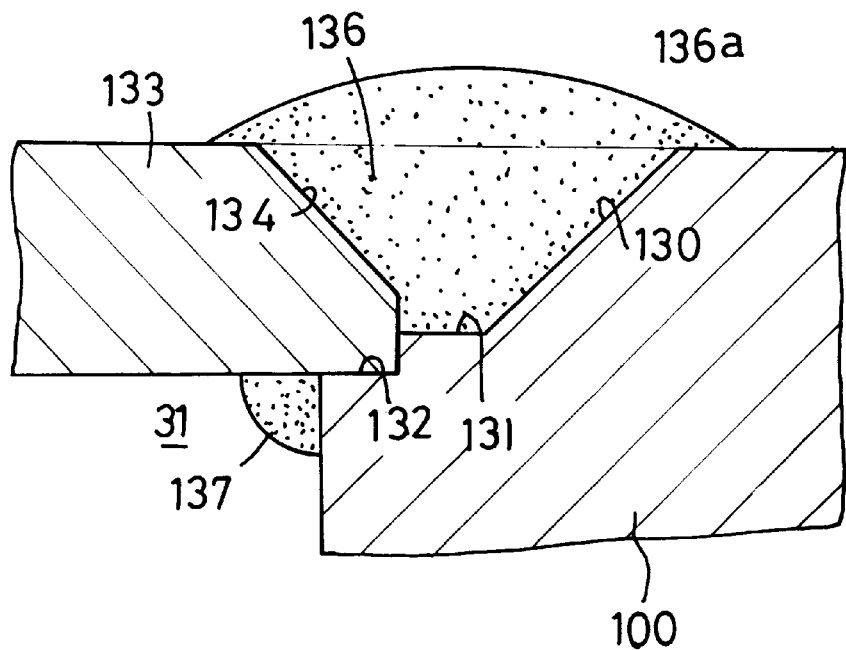
FIG. 15 is a cross sectional view taken along line XV—XV in FIG. 11.

FIGS. 14 and 15 show the placement of the lid member over the groove 31 and schematically depict the state of the beads following welding and before finishing. As shown in FIG. 14, a slight gap 135 is formed between the lid member 133 and the left crank 100 main body on both lateral sides of the concave groove 31. This gap 135, however, need not be designed, and the lid member 133 may simply abut the left crank main body. When the parts are welded in this state, a surface bead 136 is formed. The aluminum alloy welding metal which is fused at the same time eliminates the gap 135 and forms a reverse bead 137 on the other side, where it is suspended in the interior of the concave groove 31. When there is no gap 135 and the parts abut, the matrix is still similarly fused and forms are verse bead 137.

As shown in FIG. 15, both longitudinal ends of the lid member 133 are placed on the stepped component 132 so that the lid member 133 is accurately positioned prior to welding. Thus, no welding jig is needed to secure the lid member 133. When lid member 133 is welded, a surface bead 136 and reverse bead 137 are formed in the manner described above. Although lid member is supported by stepped component 132, the width of the stepped component 132 is extremely narrow so that the fused welding metal or matrix travels around to the other side when the materials are welded.

When the welding is complete, the excess part 136a of the surface bead 136 is shaved until it is level with the matrix by a mechanical process such as a milling process. This shaving process results in an appearance which makes it virtually impossible to tell that the lid member 133 has been welded. The reverse bead 137 is not shaved but is effective in preserving the bonding strength of the welded parts.

As is apparent in FIG. 15, the thickness of the lid member 133 and that of the left crank 100 main body are markedly different at the longitudinal ends of the crank arm. The heat capacity of the lid member 133 and the left crank 100 main body are thus completely different. When they are welded, the fused and welded parts are not uniform on the lid member 133 side and the left crank 100 main body side, and this adversely affects the appearance, strength, and the like. To prevent this from occurring, welding butts are formed as shown in FIG. 16.

Figure 16:
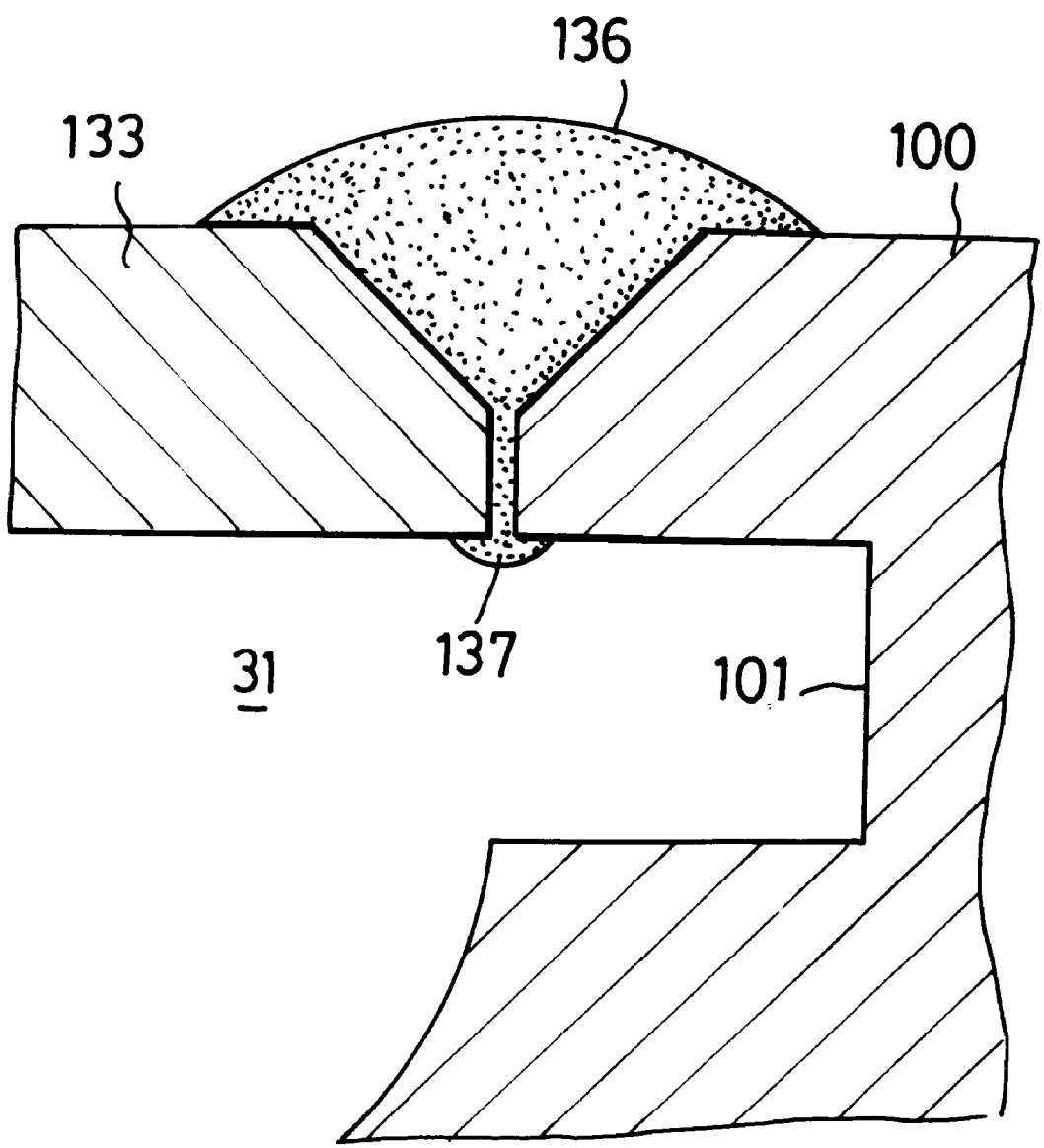
FIG. 16 is a cross sectional view taken along line XV—XV in FIG. 11 showing an alternative embodiment of a crank arm according to the present invention.

FIG. 16 is a cross section taken along line XV—XV in FIG. 11. The side of the groove 31 on the end 2 of the crank on the crank shaft mounting side is similarly structured. As shown in FIG. 16, a side concave component 101 is formed on the side of the left crank 100, making the thickness of the lid member 133 and that of the welding butts of the left crank 100 virtually the same. To form the side concave component 101, a shaving process should be implemented by means of a milling process or the like on the side of the groove 31. Since the thickness of the lid member 133 and that of the welding butts of the left crank 100 are virtually the same, the heat capacity is now virtually the same for both parts, so the heat is uniformly diffused throughout the parts on both sides during welding. This allows uniform and stable fused welding parts to be obtained.

Forming the side concave component 101 means that the stepped component 132 near the center axis of the left crank 100 is eliminated, but since the stepped component 132 still remains except in the vicinity of the longitudinal axis, the lid member 133 may still be placed in position without impediment.

The following is an example of the material and dimensions of a sample crank arm:

Material for right crank 1 and left crank 100 main body: aluminum alloy A7779

Wall thickness of crank main body between front surface of middle part 3 of crank and floor of middle part of concave groove 31: 1.5 mm Material for lid member 33: aluminum alloy A7779

Wall thickness of lid member 33: 1.5 mm

Wall thickness of lid member 133: 3.0 mm

While the above is a description of various embodiments of the present invention, further modifications may be employed without departing from the spirit and scope of the present invention. For example, the stepped component 132 may be omitted, and a welding jig may be used to temporarily position the lid member 133. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A method of manufacturing a bicycle crank arm comprising the steps of:

forming a crank arm body (1,100) having a first opening (21) on one end (2) for fitting to a crank axle (5), a second opening (41) on another end (4) for fitting to a pedal, and a longitudinal groove (31) defined by an inner wall (28);

forming at least two separate stepped surfaces (132) in the inner wall (28) defining the longitudinal groove (31);

positioning a lid member (133) over the longitudinal groove (31);

supporting the lid member (133) with the stepped surfaces (132); and welding the lid member (133) to the crank arm body (1,100).

2. The method according to claim 1 wherein the welding step comprises the step of forming reverse beads (137) inside the longitudinal groove (31).

3. The method according to claim 2 wherein the shaving step comprises the step of shaving any external beads (136) formed by the welding step so that a surface of a junction between the middle section (3) and the lid (33) is even with a surface of the middle section (3) and the lid (33) along an entire length of the junction.

4. The method according to claim 1 further comprising the step of forming the lid member (133) as a single plate having a beveled outer peripheral surface (11).

5. The method according to claim 1 wherein the step of positioning the lid member (133) comprises the step of placing the lid member (133) on the stepped surfaces (132).

6. The method according to claim 5 further comprising the step of forming a part of the crank arm (1,100) adjacent to the lid member (133) to a thickness approximately equal to a thickness of the lid member (133).

7. The method according to claim 5 further comprising the step of forming a concave groove (101) on an inner side surface of the crank arm aligned below the lid member (133) so that a portion of the crank arm (1,100) above the concave groove (101) has a thickness approximately equal to a thickness of the lid member (133).

8. The method according to claim 1 wherein the step of forming the at least two separate stepped surfaces (132) comprises the step of forming separate stepped surfaces (132) on the crank arm body (1,100) at both longitudinal ends of the crank arm body (1,100) inside the longitudinal groove (31), and wherein the step of positioning the lid member (133) comprises the step of placing the lid member (133) on the stepped surfaces (132).

9. The method according to claim 8 further comprising the step of forming a part of the crank arm (1,100) adjacent to the lid member (133) at both longitudinal ends to a thickness approximately equal to a thickness of the lid member (133).

10. The method according to claim 8 further comprising the step of forming a concave groove (101) on an inner side surface of the crank arm aligned below the lid member (133) at both longitudinal ends of the crank arm so that portions of the crank arm (1,100) above the concave groove (101) have a thickness approximately equal to a thickness of the lid member (133).

11. The method according to claim 1 wherein the step of forming the crank arm body (1,100) includes the steps of:
    forming, on the inner wall (28), a generally horizontal surface (131) and an inclined side surface (130) that is inclined relative to the horizontal surface (131); and
    forming a generally vertical surface on the inner wall (28) located between the horizontal surface (131) and the inclined surface (130) so that the inclined surface (130) originates at and extends from the vertical surface.

12. The method according to claim 7 wherein the step of forming the concave groove (101) further comprises the step of forming the concave groove (101) in the vicinity of a longitudinal center axis of the crank arm (1,100) so that the separate stepped surfaces (132) are disposed on opposite lateral sides of the concave groove (101).

13. The method according to claim 10 wherein the step of forming the concave groove (101) further comprises the step of forming concave grooves (101) at both longitudinal ends of the crank arm in the vicinity of a longitudinal center axis of the crank arm (1,100) so that the separate stepped surfaces (132) are disposed on opposite lateral sides of the concave grooves (101).

14. A method of manufacturing a bicycle crank arm comprising the steps of:
    forming a crank arm body (1,100) having a first opening (21) on one end (2) for fitting to a crank axle (5), a second opening (41) on another end (4) for fitting to a pedal, and a longitudinal groove (31);
    forming at least two separate stepped surface (132) on the crank arm body (1,100) inside the longitudinal groove (31);
    forming a concave groove (101) on an inner side surface of the crank arm aligned below the lid member (133) and in the vicinity of a longitudinal center axis of the crank arm (1,100) so that separate stepped surfaces (132) are disposed on opposite lateral sides of the concave groove (101) and so that a portion of the crank arm (1,100) above the concave groove (101) has a thickness approximately equal to a thickness of the lid member (133);
    positioning a lid member (133) over the longitudinal groove (31) on the stepped surface (132);
    welding the lid member (133) to the crank arm body (1,100); and
    shaving any external beads (136) formed by the welding step.

15. A method of manufacturing a bicycle crank arm comprising the steps of:
    forming a crank arm body (1,100) having a first opening (21) on one end (2) for fitting to a crank axle (5), a second opening (41) on another end (4) for fitting to a pedal, and a longitudinal groove (31);
    forming separate stepped surfaces (132) on the crank arm body (1,100) at both longitudinal ends of the crank arm body (1,100) inside the longitudinal groove (31);
    forming concave grooves (101) on an inner side surface of the crank arm aligned below the lid member (133) at both longitudinal ends of the crank arm and in the vicinity of a longitudinal center axis of the crank arm (1,100) so that separate stepped surfaces (132) are disposed on opposite lateral sides of each concave groove (101) and so that portions of the crank arm (1,100) above each concave groove (101) have a thickness approximately equal to a thickness of the lid member (133);
    positioning a lid member (133) over the longitudinal groove (31) on the stepped surface (132);
    welding the lid member (133) to the crank arm body (1,100); and
    shaving any external beads (136) formed by the welding step.

16. The method according to claim 1 wherein the step of forming the at least two separate stepped surfaces (132) comprises the step of forming separate stepped surfaces (132) at opposite lateral sides of the longitudinal groove (31).

17. The method according to claim 1 wherein the step of forming the at least two separate stepped surfaces (132) comprises the step of forming separate stepped surfaces (132) at opposite longitudinal sides of the longitudinal groove (31).

18. The method according to claim 1 wherein the step of forming the at least two separate stepped surfaces (132) comprises the steps of:
    forming a first stepped surface (132) at a first longitudinal end of the longitudinal groove (31) and at a first lateral side of the longitudinal groove (31);
    forming a separate second stepped surface (132) at the first longitudinal end of the longitudinal groove (31) and at a second lateral side of the longitudinal groove (31) opposite the first lateral side of the longitudinal groove (31);
    forming a separate third stepped surface (132) at a second longitudinal end of the longitudinal groove (31) opposite the first longitudinal end of the longitudinal groove (31) and at the first lateral side of the longitudinal groove (31); and
    forming a separate fourth stepped surface (132) at the second longitudinal end of the longitudinal groove (31) and at the second lateral side of the longitudinal groove.

* * * * *